United States Patent [19]

Clack et al.

[11] 4,235,340
[45] Nov. 25, 1980

[54] SALT GRID FOR A BRINE TANK

[75] Inventors: Richard E. Clack, DeForest, Wis.; Jack E. Wies, Forest Lake, Minn.

[73] Assignee: Clack Corporation, Windsor, Wis.

[21] Appl. No.: 50,659

[22] Filed: Jun. 21, 1979

[51] Int. Cl.³ ............................................. B65D 21/00
[52] U.S. Cl. .................................... 206/515; 210/190; 210/193
[58] Field of Search ............... 210/169, 282, 291, 152, 210/249, 464, 473, 498, 96, 190, 193; 220/66, 72, 93; 206/515, 517; 248/94; 150/0.5

[56] References Cited

U.S. PATENT DOCUMENTS

| | | | |
|---|---|---|---|
| 450,209 | 4/1891 | Whiddit | 210/498 X |
| 647,259 | 4/1900 | Harris | 210/291 |
| 956,332 | 4/1910 | Fuller | 210/473 X |
| 1,540,325 | 6/1925 | Fuller | 210/498 |
| 1,673,703 | 6/1928 | Orman | 220/66 |
| 3,273,741 | 9/1966 | Faunce | 220/93 |
| 3,432,038 | 3/1969 | Heskett | 210/96.1 |
| 3,451,328 | 6/1969 | Swett | 150/0.5 |
| 3,701,456 | 10/1972 | Alroy | 220/66 |
| 3,954,614 | 5/1976 | Wright | 210/DIG. 23 |
| 3,987,941 | 10/1976 | Blessing | 220/93 |

Primary Examiner—Theodore A. Granger
Attorney, Agent, or Firm—Lockwood, Dewey, Alex & Cummings

[57] ABSTRACT

A unitary, one-piece salt grid, not subject to disassembly during shipment or installation in a brine tank, which is nestable into other grids for convenient shipment or storage prior to placement into the brine tank. The unitary salt grid includes a generally planar platform suitable for supporting and elevating granular salt above at least a portion of a concentrate brine in the bottom of the brine tank by spanning the interior area of the brine tank at a spaced position above the bottom of the tank, reinforcing ribs forming an integral part of a lower side of the platform to maintain the shape of the platform under the weight of the salt on an upper surface of the platform, and a plurality of supporting feet also forming an integral part of the platform and adapted to engage the bottom of the brine tank and support the platform at the spaced position above the brine tank bottom. The supporting feet include hollow frusto-conical sections such that the salt grids are nestable into one another.

14 Claims, 5 Drawing Figures

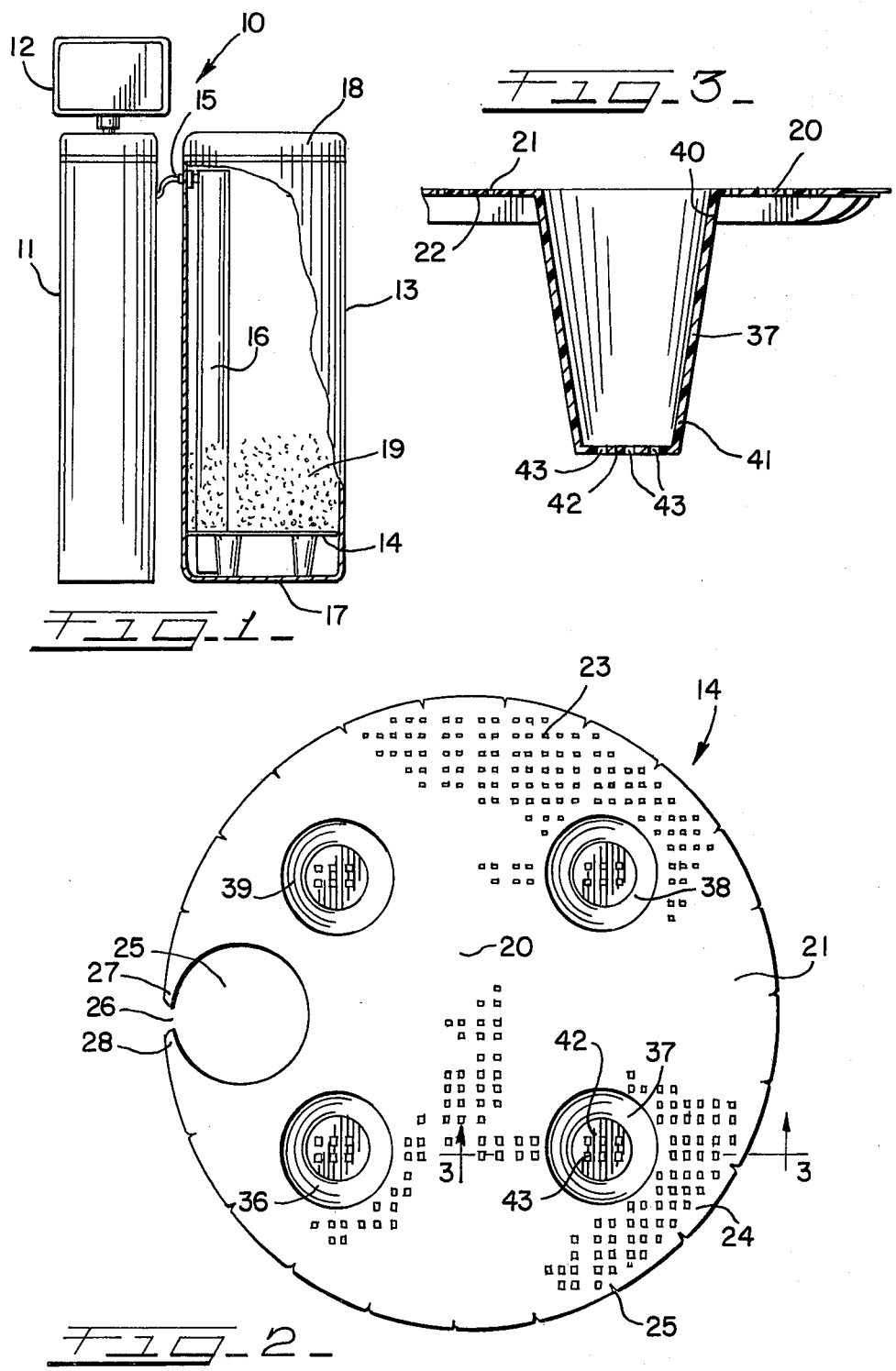

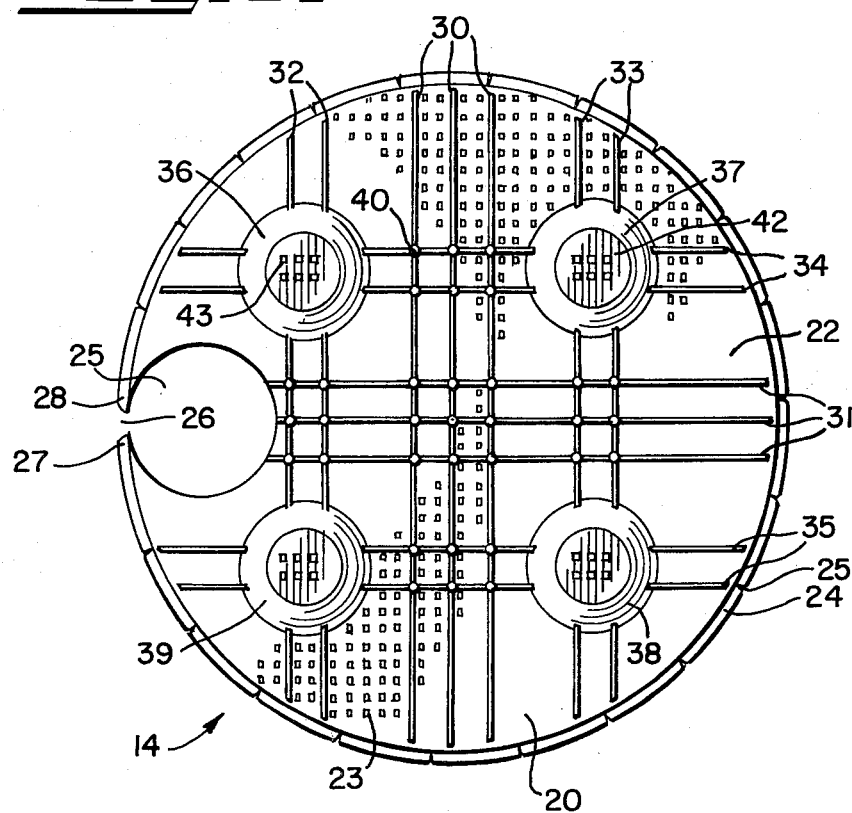
FIG-4-
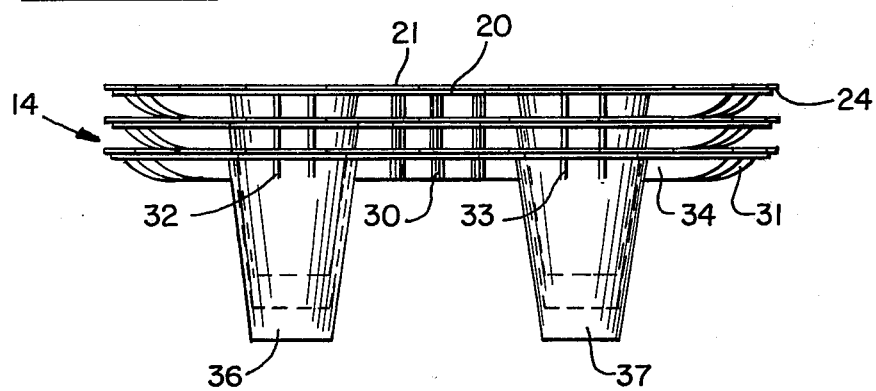
FIG-5-

SALT GRID FOR A BRINE TANK

This invention relates in general to a salt grid for supporting and elevating salt pellets above a portion of a concentrated brine solution in a brine tank which forms part of a water softening system, and more particularly relates to a unitary, one-piece salt grid which is not subject to disassembly during installation or shipment of the salt grid in the brine tank and which further provides nesting capabilities for greater efficiency and convenience in storing or shipping a plurality of such salt grids prior to placement of one of the grids in a brine tank.

Ion exchange water softening systems are well known to the prior art to reduce the hardness of water by substitution of hardness producing divalent cations with monovalent sodium cations through the well known ion exchange principle. Such ion exchange water softeners require periodic recharging or regeneration of the ion exchange medium by the contacting thereof with a concentrated sodium ion source, commonly a brine solution. The concentrated brine solution is usually supplied from a brine tank which may be an integral part of the water softening system, or a separate tank.

The brine system commonly includes a tank, a brine valve and associated forced circulation device for supplying a predetermined volume of brine to the ion exchange resin. Since the brine has a density greater than water, the brine is drawn from a location adjacent the bottom of the tank. Typically these tanks are characterized by a salt bed, at least a portion of which is in contact with water, causing the salt to dissolve to thereby form the concentrated brine solution which, by virtue of gravitational forces, sinks to the tank bottom. As is readily apparent, it is undesirable for any salt crystals or pellets to be transmitted with the brine solution to the ion exchange medium. Accordingly, it has been common and known to the prior art to utilize some type of apparatus to support the granular salt at a fixed level above the bottom of the brine tank, but below the top level of the brine solution in the brine tank. Salt is thereby dissolved into the water yielding the concentrated brine solution without any appreciable amount of undissolved salt being transmitted with the concentrated brine solution when the brine solution is drawn from the bottom of the brine tank through the brine valve.

For the convenience of the water softener user, brine tanks are typically constructed to accommodate a large volume of salt such that the water softening system may go through many regeneration cycles without having to continually replenish salt in the brine tank. For example, currently popular cylindrically-shaped brine tanks typically have a diameter of about 18 inches and are generally at least 30 to 40 inches, or more, in height. Due to the relatively large height to diameter of such brine tanks, the salt grid which typically lies close to the bottom of the brine tank, is difficult to install or remove, particularly by attempting to reach to the bottom of the brine tank without special tools.

Currently commercially utilized salt grids are fabricated from a plurality of separate pieces or components. For example, one common type of salt grid employs a plurality of planar supports having vertical slots therein, the planar supports then being assembled together in a cross-notched fashion, analogous to the separators commonly employed in cardboard bottle carrier cases. A salt supporting plate, or the like is then laid upon the assembled and interconnected planar supports. Such conventional salt grids readily fall apart or disassemble when the brine tank is in a non-upright position. Accordingly, in order to keep such salt grids assembled prior to installation, some manufacturers have resorted to employing spacers or other packing material which are disposed between the salt grid supporting plate and the cover of the brine tank. This is not a particularly satisfactory arrangement since, as mentioned above, the interior volume of the brine tank is fairly substantial and therefore requires a considerable volume of spacing or packing material between the salt grid and the cover of the brine tank. Alternatively, some manufacturers have shipped the multi-component salt grids disassembled to avoid the use of spacers or packing material, but then the salt grids must be assembled in the field when the brine tank is being installed.

Some manufacturers have also resorted to multicomponent salt grids in which certain components snap together, such as support feet which snap into a plastic top plate. This type of construction has similarly not proven entirely satisfactory since vibration may still cause disassembly of the components and such structures frequently do not possess the desired strength to support a large volume of salt in the brine tank.

Many of the prior art salt grids further substantially impede the flow of the brine concentrate under the salt grid, such as the salt grid employing the crossnotched supports which tend to subdivide the volume below the salt supporting plate into separate compartments and tend to block or at least impede the flow of brine toward the brine valve tube.

Accordingly, it is a principal object of the present invention to provide a salt grid which is of a unitary, one-piece construction which is not subject to disassembly during shipment or other handling prior to installation and which is convenient to install or remove.

A related object is to provide a salt grid for supporting granular salt at an elevated position above the bottom of the brine tank, without appreciably interfering with or blocking the flow of brine concentrate toward the brine valve.

Another object of the present invention is to provide such a salt grid having a platform shaped to span the interior area of the brine tank between the sidewalls at a spaced position above the bottom of the brine tank with an upper surface of the platform suitable for supporting granular salt thereupon, reinforcing means forming an integral part of the platform on a lower side thereof and adapted to maintain the shape of the platform under the weight of the granular salt, and a plurality of supporting feet also forming an integral part of the platform, the supporting feet adapted to engage the bottom of the brine tank and support the platform and the reinforcing means at a spaced position above the bottom of the brine tank.

A further object of the present invention is to provide such a salt grid which is easily formed from known thermoplastic molding techniques from polypropylene, glass-filled polypropylene or glass-filled polyethylene.

Yet another object of the present invention is to provide such a salt grid which is nestable into similar salt grids for more convenient and economical shipment and storage of the salt grids prior to installation of one of the salt grids into a brine tank.

The unitary, one-piece salt grid of the present invention includes a platform shaped to substantially span a generally horizontal interior area between the sidewalls of a brine tank at a spaced position above the bottom of the tank with an upper surface of the platform suitable for supporting granular salt thereupon, reinforcing means forming an integral part of the platform on the lower surface of the platform and adapted to maintain the shape of the platform under the weight of granular salt on the upper surface thereof, and a plurality of supporting feet also forming an integral part of the platform, the supporting feet adapted to engage the bottom of the brine tank and support the platform and reinforcing means at said spaced position above the bottom of the brine tank. The platform preferably has planar upper and lower surfaces and is of substantially uniform thickness between the surfaces. The reinforcing means may comprise a plurality of spaced apart ribs in generally perpendicular relationship to the lower surface of the platform and forming an integral part thereof. Some of the reinforcing ribs may be perpendicular to others to form a lattice work of reinforcing ribs on the under surface of the platform. A plurality of small apertures are preferably defined through the platform between the upper and lower surfaces to permit the brine concentrate formed by contact of water in the tank to sink to the tank bottom. A larger generally circular aperture is defined through the platform and is adapted to receive therethrough a brine valve tube associated with the brine tank. The salt grid is preferably formed from a thermally deformable plastic material, such as polypropylene, glass-filled polypropylene, or glass-filled polyethylene, by known thermoplastic molding techniques. A plurality of supporting feet are each in the form of a hollow frusto-conical section with a larger diameter end of the frusto-conical section terminating in and forming an integral part of the platform, and a smaller diameter end of the frusto-conical section suitable for engaging the bottom of the brine tank. An outer circumferential edge of the platform is notched at radially spaced points therealong with the outer edge of the platform further being of less thickness than the platform to define circumferential hinges for flexibly and resiliently engaging against the inner surface of the brine tank sidewalls to block any flow of undissolved salt between the platform and the sidewalls.

The features of the present invention, which are believed to be novel, are set forth with particularity in the appended claims. The invention together with the further advantages thereof can best be understood by reference to the following description taken in conjunction with the accompanying drawings, in the several figures in which like reference numerals identify like elements, and in which:

FIG. 1 is an elevational view of a water softening system, including a brine tank which is shown partially broken away to illustrate the unitary and one-piece salt grid of the present invention resting on a bottom surface of the brine tank and supporting granular salt at an elevated position above the brine tank bottom;

FIG. 2 is a top plan view of the upper surface of the salt supporting platform of the unitary and one-piece salt grid of the present invention;

FIG. 3 is a sectional view taken substantially along line 3—3 in FIG. 2 illustrating the frusto-conical support legs which form an integral part of the salt grid;

FIG. 4 is a bottom plan view of the salt grid further illustrating the frusto-conical support feet and the reinforcing ribs which form an integral part of the lower side of the salt grid platform and the circumferential hinges about the outer periphery of the salt grid; and FIG. 5 is an elevational view of three salt grids stacked within each other in nesting relationship.

With reference to FIG. 1, there is shown a water softening system, generally designated 10, including a resin tank 11, a control box 12 and a brine tank 13. It is understood that for the purpose of disclosing a preferred embodiment of the invention, FIG. 1 also illustrates one possible type of water softening system 10 in which a salt grid 14 of the present invention may be employed; it being further understood that salt grid 14 of the present invention may be used with or adapted to other types of water softening systems. For example, brine tank 13 could be sufficiently large to also include the resin tank 11 therein, with control box 12 mounted on or located near the top of brine tank 13.

Resin tank 11 typically includes an ion exchange medium such as, for example, cation exchange resin beads. Control box 12 includes valves (not shown) and actuation apparatus (not shown), such as a timer, to periodically and automatically regenerate water softening system 10 at desired time intervals by treating the ion exchange medium in resin tank 11 with a concentrated brine solution from brine tank 13. To this end, at least one fluid conduit 15 is in controllable fluid communication between resin tank 11 and brine tank 13. The end of fluid conduit 15 in brine tank 13 is enclosed by a brine valve tube 16 which is vertically disposed within brine tank 13 and adjacent to the cylindrical sidewall thereof. That is, fluid conduit 15 extends to the bottom 17 of brine tank 13 within brine valve tube 16. Brine valve tube 16 does not contact bottom 17 of brine tank 13, but terminates slightly above bottom 17 such that brine concentrate in the bottom of brine tank 13 may flow into the bottom end of brine valve tube 16.

Brine tank 13 is typically of greater height than diameter for storing therein a quantity of granulate or pelletized salt 19 on top of salt grid 14. Brine tank 13 has a removable cover 18 for partially or fully filling the interior of brine tank 13 with salt. The level of water or brine concentrate in brine tank 13 is typically controlled by a float valve (not shown), or the like, disposed within brine valve tube 16 such that the fluid or water level in brine tank 13 will be limited to about one inch above the top of salt grid 14. A substantial volume of brine concentrate is therefore disposed below the salt grid 14, but the brine concentrate also comes into contact with at least some of the salt supported and elevated by salt grid 14 such that the brine concentrate becomes saturated with dissolved salt.

Salt grid 14 is illustrated in greater detail in FIGS. 2 through 4. A platform 20 may be of various shapes to accomodate differently shaped brine tanks, but will typically be of generally circular shape for insertion into a generally cylindrical brine tank 13 to substantially span a generally circular horizontal interior area in the brine tank between the sidewalls of the brine tank at a spaced position above bottom 17 of the brine tank. Salt 19 is supported upon a substantially planar upper surface 21 of the platform 20. Platform 20 also has a substantially planar lower surface 22 with the platform 20 being of generally uniform thickness, for example, approximately 0.10 inches. A plurality of apertures 23 are defined through platform 20 such that brine concentrate readily sinks to the bottom of tank 13. For example, apertures 23 are preferably squares having side dimensions of approximately 0.125 inches and spaced apart on approximately 0.50 inch centers. Such a dimensional relationship permits the brine concentrate to freely pass to the tank bottom while at the same time limiting and substantially blocking wettened salt from flowing through apertures 23 to bottom 17 of brine tank 13.

Platform 20 may also be provided with a generally cylindrical aperture 25 disposed near a circumferential location for receiving therethrough and surrounding brine valve tube 16. A gap 26 between circumferential edge 24 and aperture 25 permits installation of salt grid 14 past fluid conduit 15 and its associated hardware. To this end, a pair of opposed tabs 27 and 28 of circumferential edge 24 near gap 26 are of sufficient flexibility to permit gap 26 to be increased in size, if required, to pass by fluid conduit 15 and the associated hardware when installing or removing salt grid 14.

Circumferential edge 24 is substantially free of any apertures 23 and contains a plurality of radially disposed notches 25 at spaced radial positions therealong. Circumferential edge 24 is also of reduced thickness, as compared to platform 20, for example, approximately 0.05 inches. Circumferential edge 24 is therefore segmented into a plurality of circumferential hinges which resiliently contact the inside sidewalls of brine tank 13 and thereby compensate for any eccentricities or manufacturing tolerances in either salt grid 14 or brine tank 13 to keep salt 19 from passing between salt grid 14 and the sidewalls of brine tank 13 and into the brine concentrate area between platform 20 and bottom 17.

In accordance with one aspect of the present invention, reinforcing means form an integral part of platform 20 of the unitary and one-piece salt grid 14. A set of three generally parallel and spaced apart ribs 30 are in perpendicular and intersecting relationship to another set of three ribs 31 with the sets of ribs 30 and 31 intersecting near the center of platform 20. The set of ribs 31 terminate at aperture 25 so as not to obstruct same for receiving brine valve tube 16 therethrough. Two other sets of ribs 32 and 33, consisting of two ribs each, are in generally and parallel spaced apart relationship to ribs 30 and on either side thereof. Similarly, two other sets of ribs 34 and 35 are in generally parallel and spaced apart relationship to ribs 31 and disposed on either side thereof. In the path of sets of ribs 32, 33, 34 and 35 are a plurality of supporting feet 36, 37, 38 and 39, to be further discussed hereinafter, against which certain of sets of ribs 32, 33, 34 and 35 terminate and to which said sets of ribs are rigidly secured. Each of ribs 30 through 35 form an integral part of platform 20 and ribs 32 through 35 additionally form an integral part of some of the supporting feet 36 through 39. Ribs 30 through 35 additionally are substantially perpendicular to platform 20 so as to enhance reinforcement of platform 20 for supporting considerable weights of salt thereupon, for example, up to 100 pounds, or more. Further to this end, any intersection 40 between any of ribs 30 through 35 consists of a small frusto-conical section at intersection 40 for further reinforcement between the various ribs 30 through 35. Ribs 30 through 35 may, by way of example, have a horizontal thickness of approximately 0.075 inches and a vertical height of approximately 0.60 inches; the horizontal thickness preferably being slightly tapered for ease of injection molding.

According to another aspect of the present invention, a plurality of supporting feet 36 through 39 form an integral part of platform 20, as is best seen in FIG. 3. Each of the supporting feet 36 through 39 are in the form of a frusto-conical section. A larger diameter end 40 of each frusto-conical foot terminates in and forms an integral part of platform 20, with end 40 being open. A smaller diameter end 41 of each frusto-conical foot is substantially closed by a planar surface 42 in generally perpendicular relationship to the axis of each foot, the surface 42 adapted to engage and rest upon bottom 17 of brine tank 13. Surface 42 has at least one aperture 43, similar to apertures 23 through platform 20, defined through surface 42 such that the brine concentrate will at least partially fill the hollow frusto-conical supporting feet 36 through 39 so as to avoid any buoyancy or floatation of salt grid 14 in the brine concentrate when the salt grid is not supporting a heavy salt load. Apertures 43 are similarly of about the same dimension as apertures 23 to prevent discharge of wettened salt through any of the supporting feet into the brine concentrate area, as when salt grid 14 is removed or otherwise adjusted. Each foot 36 through 39 is typically about 5 inches in height, with a 3½ inch outside diameter end 40 and a 2 inch outside diameter end 41 and a frusto-conical wall thickness of about 0.10 inch.

In accordance with another aspect of the present invention the hollow frusto-conical shaped feet 36 through 39, while providing a unitary and one-piece salt grid, also permit a plurality of salt grids 14 to be stacked in nesting relationship as seen in FIG. 5. Bottom edges of ribs 30 through 35 stop against upper surface 21 of platform 20 of an underlying salt grid such that the salt grids do not become jammed together while in nesting relationship and are therefore easily separable. The nesting relationship is of considerable value in shipping and storage of salt grids 14 prior to insertion of one of the salt grids into a respective brine tank 13, it being understood that only one salt grid 14 is needed for each brine tank 13.

The present invention also affords economy of manufacture since the afore-described structure may be inexpensively molded from thermoplastic materials by known thermoplastic molding techniques. Preferred thermoplastic molding materials include polypropylene, glass-filled polypropylene or glass-filled polyethylene. Thermosetting materials may also be utilized in molding the salt grid.

Due to its one-piece and unitary construction, the salt grid of the present invention may be easily installed in a brine tank 13 by simply pushing down on upper surface 21 of platform 20 until support feet 36 through 39 come to rest on bottom 17 of brine tank 13. Furthermore, no amount of vibration, handling or other disturbance to brine tank 13 will cause salt grid 14 to become disassembled and thereby require reinstallation. Should salt grid 14 become dislodged, as during transit, the salt grid may simply and easily be reinstalled to its operational position on the bottom of brine tank 13.

While a particular embodiment of the invention has been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

I claim:

1. A unitary, one-piece salt grid for supporting granular salt and elevating the granular salt above at least a portion of a concentrate brine in a brine tank, said salt grid comprising:

a platform having an upper surface suitable for supporting a supply of granular salt thereupon, said upper surface of said platform being sized to substantially span a generally horizontal interior area defined in the brine tank between side walls of the brine tank at a predetermined spaced position above a bottom of the brine tank;

brine passage means in said platform for permitting flow of brine formed by dissolution of granular salt with water to the bottom of said tank; and, a plurality of supporting feet also forming an integral part of the platform, each of said supporting feet having an upper open end which extends into a downwardly tapered frusto-conical body section thereof having an axial extent which is sufficient to support the upper surface of said platform at said predetermined spaced position above the bottom of the brine tank.

2. The salt grid as defined in claim 1 wherein said brine passage means in said platform includes a plurality of generally rectangularly shaped apertures defined therethrough.

3. The salt grid as defined in claim 1 wherein the upper and lower surfaces of the platform are generally planar and said platform is of substantially uniform thickness between said surfaces.

4. The salt grid as defined in claim 3 wherein said platform includes reinforcing means which comprises a plurality of integral, spaced apart ribs in generally downwardly extending relationship with the lower surface of said platform.

5. The salt grid as defined in claim 4 wherein at least one of said reinforcing ribs is perpendicular to at least one other of said reinforcing ribs.

6. The salt grid as defined in claim 4 wherein the frusto-conical section of each supporting foot is of substantially greater length than the reinforcing means such that flow of the brine concentrate under the salt grid is substantially unimpeded.

7. The salt grid as defined in claim 6 wherein the frusto-conical supporting feet of one of said grids are insertable into the open ends of the frusto-conical feet of another of said grids, whereby a plurality of said salt grids may be stacked in nesting relationship to each other.

8. The salt grid as defined in claim 6 wherein the smaller diameter end of each of the hollow frusto-conical supporting feet is substantially closed by a planar surface, the planar surface having at least one aperture defined therethrough to permit the concentrate brine to at least partially fill said supporting feet.

9. The salt grid as defined in claim 1 wherein said platform has a generally circular aperture defined therethrough near a circumferential location of said platform, the generally circular aperture being sized for receiving therethrough a brine valve tube associated with said brine tank.

10. The salt grid as defined in claim 1 wherein said salt grid is formed of a thermally deformable plastic material.

11. The salt grid as defined in claim 10 wherein said thermally deformable plastic material is polypropylene.

12. The salt grid as defined in claim 10 wherein said thermally deformable plastic material is glass-filled polypropylene.

13. The salt grid as defined in claim 10 wherein said thermally deformable plastic material is glass-filled polyethylene.

14. The salt grid as defined in claim 1 wherein said platform is of generally circular shape, an outer circumferential edge of the platform being notched at radially spaced points therealong, the outer edge of the platform further being of less thickness than said platform to define outer radius hinges for resiliently engaging against the inner surface of a cylindrical sidewall of the brine tank.

* * * * *